United States Patent

[11] 3,625,585

| [72] | Inventor | Leo Beiser |
| | | Flushing Manor, N.Y. |
| [21] | Appl. No. | 750,086 |
| [22] | Filed | Aug. 5, 1968 |
| [45] | Patented | Dec. 7, 1971 |
| [73] | Assignee | Columbia Broadcasting Systems, Inc. |
| | | New York, N.Y. |

[54] PERIODIC SCAN MAGNIFICATION FOR LASER BEAM DEFLECTION
16 Claims, 7 Drawing Figs.

| [52] | U.S. Cl. | 350/54 |
| [51] | Int. Cl. | G02b 23/00 |
| [50] | Field of Search | 350/6, 7, 285, 54, 55; 178/7.6; 95/65 |

[56] References Cited
UNITED STATES PATENTS

| 3,062,965 | 11/1962 | Sick | 350/7 X |
| 3,382,022 | 5/1968 | Fox | 350/54 |
| 3,326,620 | 6/1967 | Marie | 350/54 X |
| 2,206,169 | 7/1940 | Eisenhut et al. | 350/60 X |
| 3,450,455 | 6/1969 | Landre | 350/7 |

*Primary Examiner*—David Schonberg
*Assistant Examiner*—T. H. Kusmer
*Attorney*—Brumbaugh, Graves, Donohue & Raymond ABSTRACT: Periodic scan enhancement takes advantage of iteration or summation of contributions from individual scanning sections. Vignetting at the scanning aperture is avoided, permitting employment of a multiplicity of elements whose sizes are diffraction limited. This is achieved by the interposition of alternate optical transfer elements that reimage the aperture of one scanning element upon the aperture of the next. The necessary progressive increase in aperture size occurs at the (static) transfer optics rather than at the (dynamic) scanning elements.

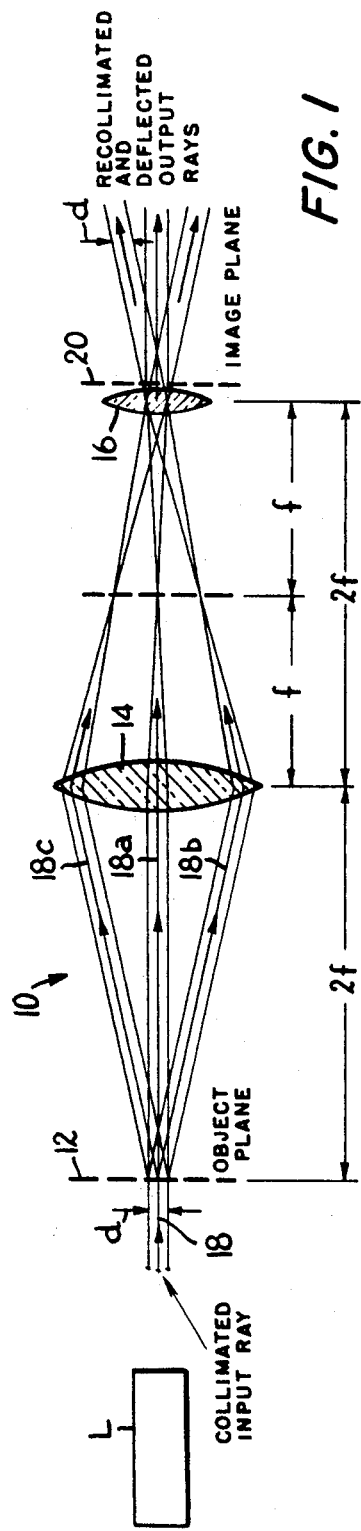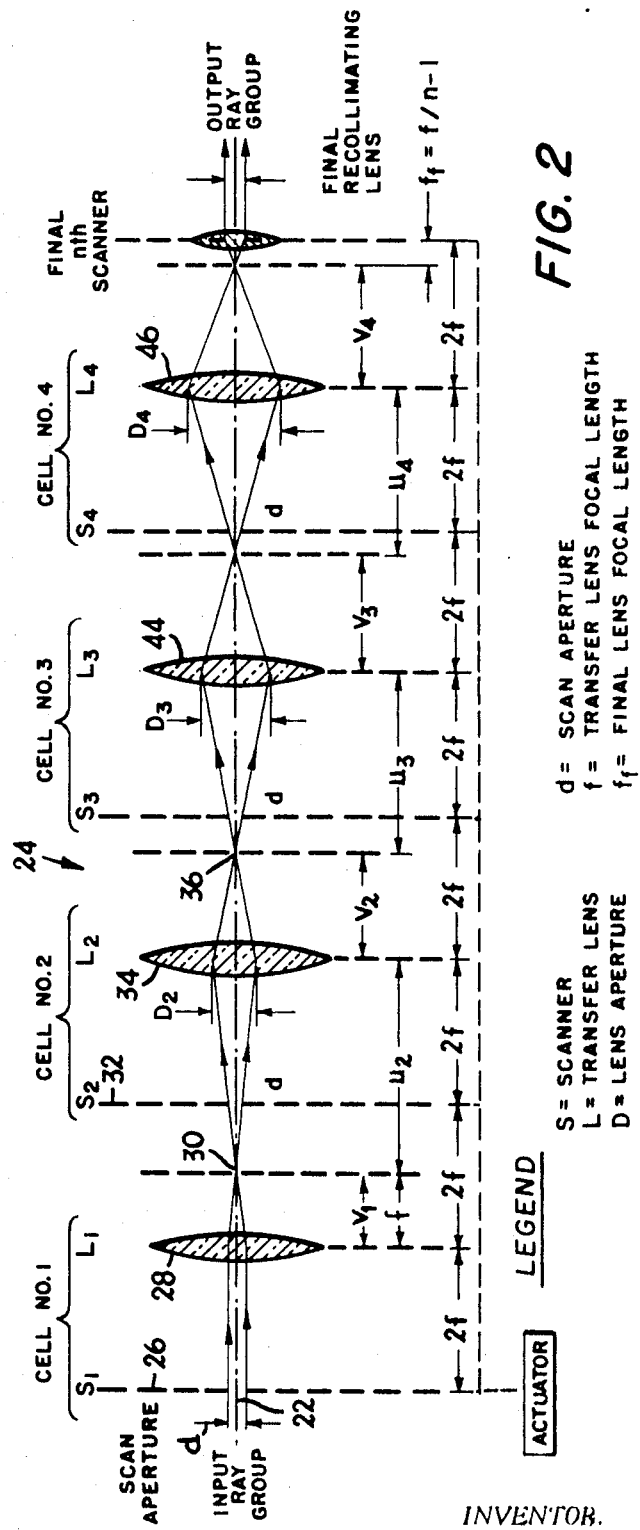

INVENTOR.
LEO BEISER

PERIODIC SCAN MAGNIFICATION FOR LASER BEAM DEFLECTION

BACKGROUND OF THE INVENTION

This invention relates to scanning apparatus and, more particularly, to novel and highly effective scanning apparatus for producing scan magnification by successive iteration.

It is conventional to provide for progressive increase of scan by successive iteration of deflecting elements. Iteration is employed to sum the contribution from a plurality of deflectors in order to overcome the poor interaction that may be established with a photon beam by means other than direct mechanical displacement.

In conventional iteration techniques, the composite deflector array is considerably extended along the optical path, which excludes the possibility of a wide deflection angle. Deflection through a tunnel ultimately forces the light beam to encounter the edge of the cavity or aperture as the deflection angle and path length are increased. An additional consequence of the demand for physically increased aperture size to avoid vignetting is the requirement for driving the larger deflector with a force adequate to impart a deflection. The drive power increases, the material dimensions increase, the power dissipation and thermal gradients increase, and the resulting aberrations increase. These factors have frustrated advances beyond a few hundred spots per scan from low-inertia deflectors.

SUMMARY OF THE INVENTION

An object of the invention is to remedy the difficulties with prior art techniques outlined above. In particular, an object of the invention is to provide a new iteration configuration which permits enhancement of the scan angle (and elements per scan) without significantly increasing the size of the individual deflecting elements.

The foregoing and other objects of the invention are attained, in a representative embodiment thereof, by the provision of scanning apparatus comprising a source of electromagnetic radiation and a plurality of cells mounted to transmit radiation from the source in series. Each of the cells includes scanning means and optical transfer means. Optical apertures are equal at each of the scanning means and progressively larger at successive optical transfer means.

The source of electromagnetic radiation is preferably a laser. The scanning and optical transfer means may be reflective or refractive and are spaced apart from each other a distance equal to twice the focal length of the optical transfer means.

The radiation source is at an effective distance from the first optical transfer means ranging from infinity to a distance equal to the focal length of the first optical transfer means. The output flux of the apparatus may be collimated, the diameter of the collimated output flux being equal to or greater than the optical apertures at the various scanning means, or the output flux of the apparatus may be focused on an image surface.

In the case where both horizontal and vertical deflection are desired and the vertical deflection aperture may be constructed larger than the horizontal aperture, periodic unequal magnification may be provided to permit alternation of horizontal and vertical deflectors.

BRIEF DESCRIPTION OF THE DRAWING

An understanding of additional aspects of the invention may be gained from a consideration of the following detailed description of several representative embodiments thereof, taken in conjunction with the accompanying figures in the drawing, wherein:

FIG. 1 is a schematic view of an optical system showing 1:1 imaging and recollimation system;

FIG. 2 is a schematic view of an optical system according to the invention showing an undeflected ray trace for periodic scan enhancement;

DESCRIPTION OF THE PREFERRED EMBODIMENTS

Figure 3:
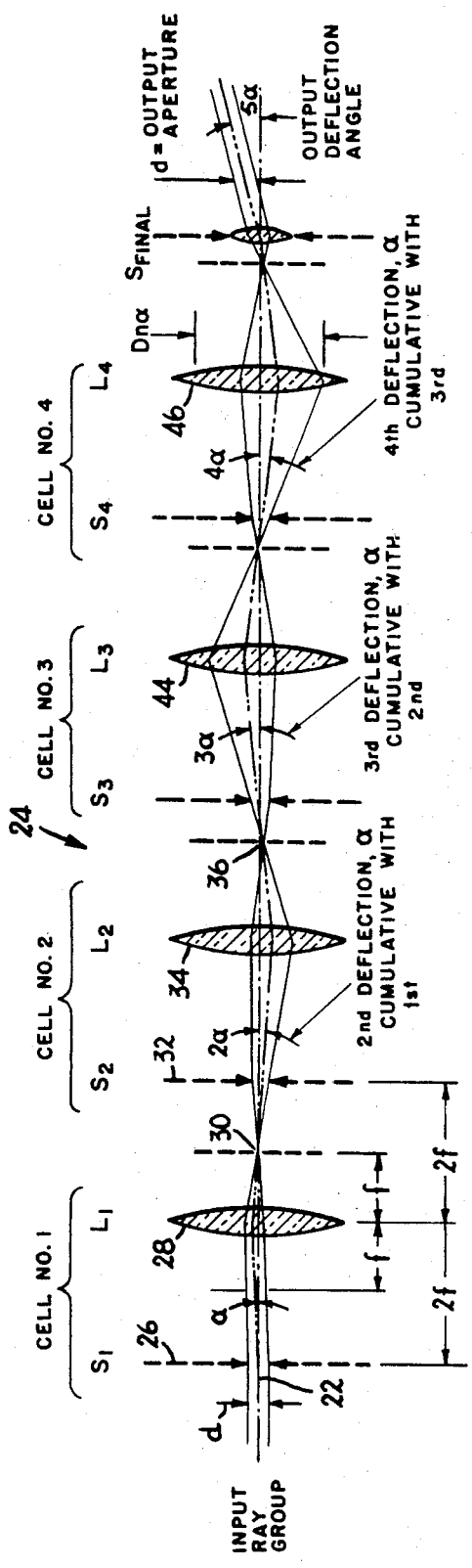
FIG. 3 is a schematic view of an optical system according to the invention showing a deflected ray trace for periodic scan enhancement.

Apparatus for scan iteration comprises a serial array of deflecting elements. Each element may be regarded as part of a scanning cell including a scanning element and an optical transfer element.

FIG. 1 shows a representative cell 10 including a scanner 12 and 1:1 transfer lens 14 of focal length $f$. The transfer lens 14 is separated from the scanner 12 by a distance equal to $2f$, or twice the focal length of the lens 14, and is further separated from a recollimating lens 16 by a distance $2f$.

A collimated input ray 18, which may originate in a laser L, represents the principal ray of a group which subtends an optical aperture $d$ at the scanner 12 and, as shown, is coincident with the optical axis of the scanner. The recollimated and deflected output rays also have an optical aperture equal to $d$. This is true regardless of the magnitude and direction of deflection imparted by the scanner 12 (within the collection angle of the transfer lens 14).

FIG. 1 illustrates three ray group positions: The undeflected group 18$a$ and the two groups 18$b$ and 18$c$ at extreme deflection. The 1:1 lens 14, being separated by a distance $2f$ from the aperture of the scanner 12 and the next succeeding scanner 20, reimages a scanning object on the aperture for the second scanner 20. The apertures for the two scanners 12 and 20 have the same dimension $d$.

The second scanner 20, located at the second aperture, also imparts a scan to the first deflected ray. Thus, if the scanning elements 12 and 20 impart equal scan magnitude, deflection is doubled with no increase in optical aperture.

If, as shown in FIG. 1, the scanning ray group is to be extracted from the system, the recollimating lens 16 is included at the plane of the second scanner 20 having a focal length (in this case) equal to that of the transfer lens 14.

The system described above performs iteration involving two scanning elements and includes two lenses. This can be generalized to the case where the first (1:1) lens 14 and deflector 12 begin an iteration of identical cells which are repeated $n$ times before a final recollimating cell restores the original ray configuration. Each deflector and lens in the array is separated from the adjacent lenses or deflectors by distance $2f$. The undeflected ray trace for this system is illustrated in FIG. 2.

The (undeflected and collimated) ray group of diameter $d$ enters the apparatus 24 from the left (as seen in FIG. 2) and encounters a first deflector 26. Since the undeflected case is illustrated, the ray group 22 proceeds past the deflector 26 undeviated and encounters a 1:1 lens 28, which brings the rays to a focus at a point 30 a distance $v_1 = f$ from the lens 28. The ray group diverges beyond the point 30 and encounters a second deflector 32. It proceeds undeviated to a lens 34, whereupon it is caused to reconverge to a focus at a point 36 removed from the lens 34 a distance $v_2 = 3/2 f$.

The ray group proceeds in similar fashion along this path of periodic focus, always traversing the deflection apertures with the same dimension $d$. The characteristics of this periodic focus system may be described by the following relationships:

a. image (focal) distance from the $n$th lens is
$$v_n = f[(2n-1)/n]; \quad 1$$

b. object (focal) distance from the $n$th lens is $$u_n = f[(2n-1)/(n-1)]; \quad (2)$$

c. the $n$th lens aperture is $$D_n = d(2n-1); \quad (3)$$

and d. the final lens has a focal length $$f_f = f[1/(n-1)], \quad (4)$$

where $f$ = focal length of each 1:1 transfer lens and $d$ = diameter of the ray group at each deflector.

In this unity magnification periodic system, the image and object conjugates of the scanning aperture are separated from either side of each transfer lens by a distance $2f$.

If successive incremental deflection is imparted at each scanner aperture, the ray trace appears as illustrated in FIG. 3. One direction of deflection is illustrated in which each scanner imparts an angular change $\alpha$ which, after five iterations, emerges from the system deflected through an angle $5\alpha$. Two properties of this system are noteworthy.

1. The aperture at each deflector has the same dimension $d$, as required for diffraction limited information conveyance. This is a most significant achievement of the system, in that $d$ need not be increased merely to avoid vignetting of the deflected light flux.
2. The aperture of each transfer lens 28, 34, 44, and 46 increases periodically. Thus, the increased aperture is traded off from the deflector to the lens, where it imposes minimum burden upon deflection.

Additional properties of this system are as follows:

1. The input rays may be injected into the system from a point at infinity (collimated, as illustrated) or from an effected point from infinity to a distance $f$ from the lens 28 to collect all the rays traversing the aperture $d$.
2. The output rays may be recollimated to a diameter $d$ (as illustrated) or larger, depending simply upon the increased focal length and lens diameter of the final lens (the $f$ number being constant). The output rays may on the other hand be refocused to an image surface. The number of spots per scan is independent of the recollimating or focusing aperture size, so long as it collects all the rays.
3. Deflection may be in any direction (horizontal, vertical, or any included angle), and the aperture $d$ remains constant (assuming optics having radial symmetry). Thus, vertical deflection may follow horizontal deflection without increasing the size of the deflecting aperture.
4. The transfer lens aperture (including scan) is $$D_f = D_n + f\alpha n,$$

where $\alpha$ = scan angle of a single deflector element and $D_n = d(2n-ah1)$ as in Eq. (3) above.

5. In the case where both horizontal and vertical deflection are desired and the vertical deflection aperture may be constructed larger than the horizontal aperture, periodic unequal magnification may be provided to permit alternation of horizontal and vertical deflectors. In this configuration, all horizontal deflectors reimage to a small aperture and all vertical deflectors reimage to a larger aperture.
6. Except for astigmatism and chromatic errors, all point image defects may theoretically be nulled as the number of iterations becomes sufficiently large. Further, during monochromatic operation (single laser line), chromatic errors are nonexistent. This freedom from aberration is approached because of the self-cancellation of coma by the successive unidirectional and oppositely phased coma introduced by each lens. Astigmatism, on the other hand, is quadratic and adds upon each iteration. However, careful lens design reduces it to a vanishingly small value (compared to diffraction limited performance). Spherical aberration, on axis, is correctable either within the system or before the laser beam enters the system.

Figure 4:
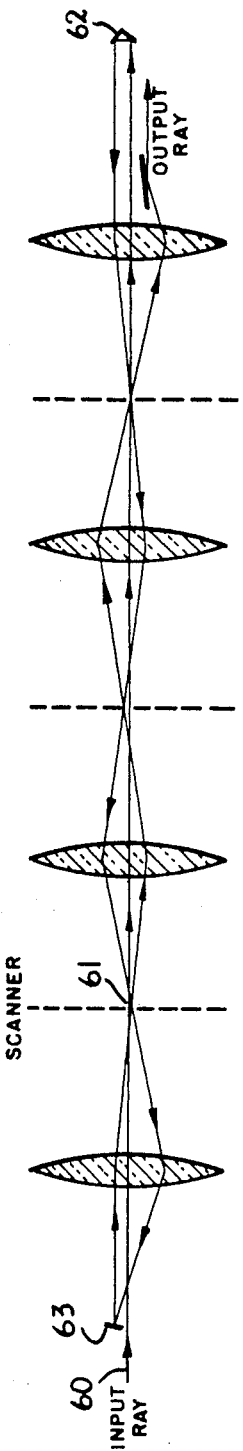
FIG. 4 is a schematic view of an optical system according to the invention showing a recycled periodic scan enhancement in three traverses by a ray group.

Another consequence of periodic scan enhancement in accordance with the invention is the ability to recycle the periodic process back and forth through (virtually) the same optical deflection system. This technique is illustrated in FIG. 4, in which, for clarity, only the path of the central ray 60 of a collimated input ray group is shown. An additional tradeoff may be apparent: the increase in deflection aperture area as the process is recycled. This is manifest by the nonaxial intersection of the ray at the scanner aperture 61, for example, and results from the need for displacement by retroreflection by mirror means 62, 63 to avoid returning the ray group to its source. Although only three traverses are shown, it is clear that additional cycles may be provided with no imposition upon the transfer lenses.

Piezoelectrically and magnetically driven mirrors have been seriously hampered in magnitude of scan and upper frequency deflector. and, up to the time of the present invention, have been limited to a narrow angle scan in the 10kHz. range. However, a vibrating mirror may be designed for high optical efficiency, no dispersion, low optical distortion, and low total drive power requirement. At wide bandwidth and high scan rate, scan magnitude rarely exceeds 5°/

At $\lambda = 0.488\mu$, a uniformly illuminated rectangular mirror 2 mm. wide provides a diffraction limited resolution angle of approximately 0.25 mrad. If we seek, for example, 1000 resolution elements, we require 1000 ×0.25 mrad=0.25 rad or approximately 15° of total scan—a magnitude generally beyond the capability of a 2 mm. broadband mirror assembly vibrating at a fundamental rate of tens of kHz. However, for ten iterated components, we require a scan angle of only $\alpha=1.5°$/ mirror. In accordance with additional property (4) above, the diameter of the largest lens aperture will be (for $f=50$ mm. focal length)

$$D_f = d(2n-1) + f\alpha n = 2 \text{ mm.}$$
$$(2 \times 9 = 1) + 50 \text{ mm.} \times 1/40 \ (9) = 45 \text{ mm.}$$

(Note: For ten iterations, the largest lens is at $n=9$.)

Thus, a lens whose diameter is 5 cm. having a 5 cm. focal length will amply include the entire scan. At this maximum aperture position, the ratio of the focal distance to the operating aperture yields the operating $f$ number, $$F = v_n/D_n = f/nd[\text{per Eqs. (1) and (3)}]. \quad (6)$$

Thus, in the above example, the final lens operates at an effective $f/2.5$ cone. All prior lenses (lower $n$) may be progressively smaller in aperture, resulting in a corresponding smaller demand upon their quality.

Figure 5A:
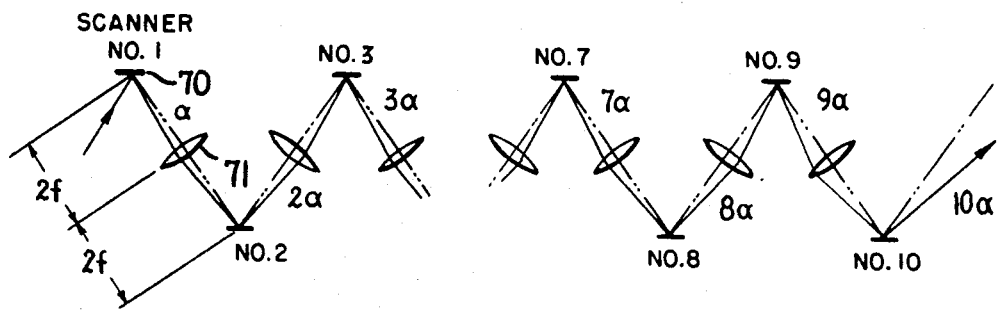
FIG. 5A and 5B are schematic views of apparatus according to the invention showing periodic mirror scan enhancement and further showing, respectively, refractive and reflective transfer optics.
Figure 5B:
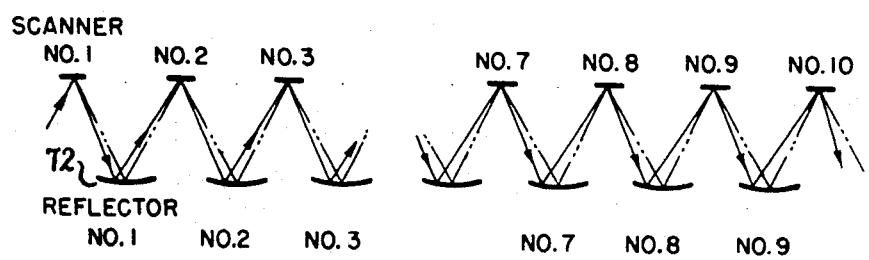

The optical schematic for a typical system will appear as illustrated in FIG. 5A, in which a mirror deflector 70 and lens 71 combination are periodically repeated. This system is adaptable to a totally reflective configuration as illustrated in FIG. 5B, in which high reflectivity elliptical mirrors 72 replace the refractive elements 71. With multidielectric coated mirrors forming all elements each having a reflectance of 0.995, the total optical transmission efficiency can approach $(0.995)^{20}$ or 90 percent.

Figure 6:
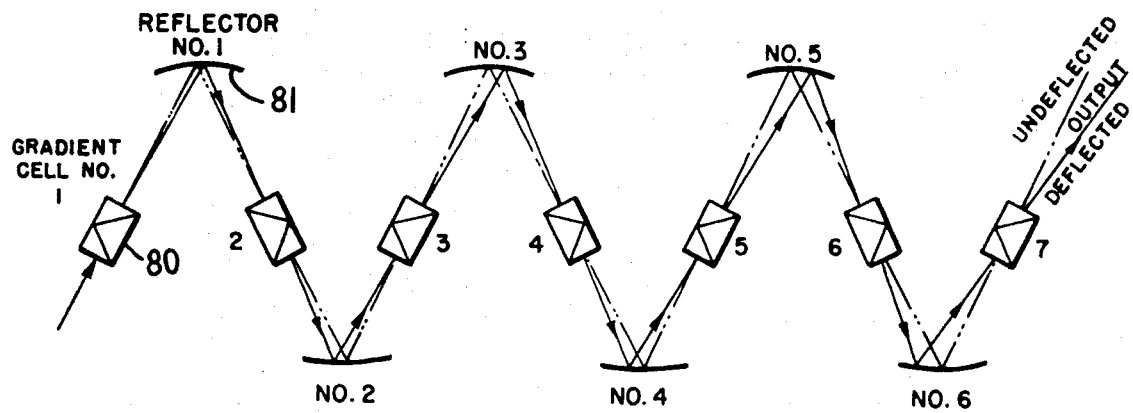
FIG. 6 is a schematic view of another embodiment of apparatus according to the invention showing periodic gradient deflection with reflective transfer optics.

Another basic iteration technique may employ a number of narrow gradient deflectors such as electrooptic prisms 80 in the high optical efficiency reflective configuration illustrated in FIG. 6. Although the consequences of traversing the deflectors 80 with convergent-divergent flux must be considered, if long focal length optics is employed, the narrower deflectors will require lower absolute potentials to develop adequate electric field within the material. Furthermore, total drive power will be reduced because of the reduction of total material through which a field must be developed. This power reduction will vary as the aperture area of the material: a square function. Hence, rapid reduction in total material and its power dissipation may be appreciated.

Thus there is provided in accordance with the invention novel and highly effective apparatus eliminating the need for progressive increase in scanning aperture as iteration is increased. Periodic scan enhancement is applicable to light scanning in general and to laser scanning in particular. It is applicable to general lissajous scan, to raster scan, and to line scan. It can be arranged to provide periodic scan reimaging of two different sized apertures, such as may be optimal for quadrature raster scan at vastly differing line and frame rates. It can be arranged to recycle the iteration process several times so that the same system can be reused further to enhance scan.

I claim:

1. Optical scanning apparatus comprising, a source of electromagnetic radiation, a plurality of cells each including scanning means operative to scan in the same direction and having an aperture and convergent optical transfer means, said cells being positioned relative to each other to be operative successively to transmit radiation from said source incident on the aperture of the scanning means of a first of said cells, along a continuous set of optical axis, contiguous ones of which join at the aperture of successive ones of said scanning means, said optical transfer means being spaced between successive scanning means by optical distances to reimage the aperture of the scanning means of a first cell upon the aperture of the scanning means of the next succeeding cell, successive ones of said optical transfer means having progressively larger apertures to avoid vignetting, and actuating means operative to synchronously actuate said scanning means to produce scan magnification by successive iteration.

2. Apparatus according to claim 1 wherein said source of electromagnetic radiation is a laser.

3. Apparatus according to claim 1 wherein said scanning means is at least partly refractive.

4. Apparatus according to claim 1 wherein said scanning means is at least partly reflective.

5. Apparatus according to claim 1 wherein said optical transfer means is at least partly refractive.

6. Apparatus according to claim 1 wherein said optical transfer means is at least partly reflective.

7. Apparatus according to claim 1 wherein successive scanning means and optical transfer means are spaced apart a distance equal to twice the focal length of said optical transfer means.

8. Apparatus according to claim 1 wherein the radiation input to the first cell is collimated.

9. Apparatus according to claim 1 wherein said source is positioned so that radiation therefrom emanates from a point spaced from the first optical transfer means by an optical distance at least as great as the focal length of said first optical transfer means.

10. Apparatus according to claim 1 further comprising means for collimating the output flux of said apparatus.

11. Apparatus according to claim 10 wherein the diameter of the collimated output flux is equal to the optical apertures at said scanning means.

12. Apparatus according to claim 10 wherein the diameter of the collimated output flux is larger than the optical apertures at said scanning means.

13. Apparatus according to claim 1 further comprising means for focusing the output flux of said apparatus.

14. Apparatus according to claim 1 wherein said plurality of scanning means have small apertures adapted for high-speed deflection and further including another plurality of cells disposed along said continuous set of optical axis, the scanning means of said second plurality of cells having relatively larger apertures and adapted for relatively lower speed deflection in a different direction.

15. Apparatus according to claim 7 wherein said scanning means have apertures of equal size.

16. Optical scanning apparatus for producing scan magnification by successive iteration comprising, in combination, a succession of at least two scanning elements each having an aperture and all operative to scan a light beam in the same direction spaced apart along a continuous set of optical axis, contiguous ones of said axes being joint at the aperture of successive ones of said scanning elements, optical transfer elements disposed between successive ones of said scanning elements and spaced therefrom by optical distances so as to reimage the aperture of a first of said scanning elements upon the aperture of the next succeeding scanning element, a light source positioned to illuminate the aperture of the first of said scanning elements, and actuating means operative to synchronously actuate said scanning elements.

* * * * *

PO-1050
(5/69)

UNITED STATES PATENT OFFICE
CERTIFICATE OF CORRECTION

Patent No. 3,625,585             Dated December 7, 1971

Inventor(s) Leo Beiser

It is certified that error appears in the above-identified patent and that said Letters Patent are hereby corrected as shown below:

In the Assignee [73], "Systems" should be --System--.
Col. 2, line 74, "1" should be --(1)--.  Col. 3, line 22,
"The aperture" should read --The Aperture D--; lines 28 & 29,
"effected" should read --effective--; line 45, following the
equation, insert --(5)--; line 47, "d(2n-ah1)" should be
--d(2n - 1)--.  Col. 4, line 11, "deflector" should be
--response--; line 12, "10kHz." should be --10-kHz--; line 16,
after "5°/" insert --deflector.--; line 39, "corresponding"
should read --correspondingly--.  Col. 5, line 8, "axis" should
read --axes--;  Col. 6, line 16, "axis" should read --axes--;
line 26, "axis" should read --axes--; line 27, "joint" should
read --joined--.

Signed and sealed this 13th day of June 1972.

(SEAL)
Attest:

EDWARD M. FLETCHER, JR.              ROBERT GOTTSCHALK
Attesting Officer                    Commissioner of Patents